(12) United States Patent
Kumar Prasad et al.

(10) Patent No.: US 12,447,842 B2
(45) Date of Patent: Oct. 21, 2025

(54) UNIVERSAL ON-BOARD CHARGER CUM INVERTER SYSTEM

(71) Applicant: MATTER MOTOR WORKS PRIVATE LIMITED, Gujarat (IN)

(72) Inventors: Telikepalli Kumar Prasad, Gujarat (IN); Jain Prashant, Gujarat (IN)

(73) Assignee: MATTER MOTOR WORKS PRIVATE LIMITED, Gujarat (IN)

( * ) Notice: Subject to any disclaimer, the term of this patent is extended or adjusted under 35 U.S.C. 154(b) by 0 days.

(21) Appl. No.: 18/712,810

(22) PCT Filed: Nov. 20, 2022

(86) PCT No.: PCT/IB2022/061183
§ 371 (c)(1),
(2) Date: May 23, 2024

(87) PCT Pub. No.: WO2023/094959
PCT Pub. Date: Jun. 1, 2023

(65) Prior Publication Data
US 2025/0033501 A1    Jan. 30, 2025

(30) Foreign Application Priority Data
Nov. 24, 2021   (IN) .............................. 202121054085

(51) Int. Cl.
*B60L 53/24*    (2019.01)
(52) U.S. Cl.
CPC ........... *B60L 53/24* (2019.02); *B60L 2210/30* (2013.01); *B60L 2210/40* (2013.01)

(58) Field of Classification Search
CPC .......... B60L 53/20; B60L 53/22; B60L 53/24; B60L 2210/30; B60L 2210/40; Y02T 10/7072; Y02T 10/70; Y02T 90/14
USPC .................................................. 307/9.1–10.2
See application file for complete search history.

(56) References Cited

U.S. PATENT DOCUMENTS

| | | | |
|---|---|---|---|
| 2013/0069424 A1* | 3/2013 | Kajouke ................. | B60L 53/22 307/9.1 |
| 2015/0283911 A1* | 10/2015 | Ambrosio ............... | B60L 50/40 307/10.1 |
| 2016/0159228 A1* | 6/2016 | Tang ....................... | B60L 53/22 307/10.1 |

\* cited by examiner

*Primary Examiner* — Rexford N Barnie
*Assistant Examiner* — Terrence R Willoughby
(74) *Attorney, Agent, or Firm* — Rivka Friedman

(57) ABSTRACT

An universal on-board charger cum inverter system (200) adapted to be implemented within a vehicle has been provided. The system 200 comprises a unified charger cum traction inverter (UCCTI) (4a, 9), a traction motor (6a, 10), a first circuit breaker (3a) and a second circuit breaker (7a) and a controller (11). The traction motor 10 is a single-phase motor or three-phase motor. The system 200 is adapted to enable charging of the vehicle with any of the single-phase or three-phase AC power supply with lesser number of components. This reduces overall weight of the vehicle that eventually aid in increasing power density and efficiency with low production cost. The system 200 is specifically designed for vehicles such as battery powered vehicles, hydrogen powered vehicle, and fuel powered vehicles.

7 Claims, 5 Drawing Sheets

UNIVERSAL ON-BOARD CHARGER CUM INVERTER SYSTEM

FIELD OF INVENTION

The present disclosure relates generally to a charger cum inverter system, and more particularly to a universal on-board charger cum inverter system for electric vehicles that is configured to perform inverter and charger functions upon supply of any of the single-phase or three-phase power supply.

BACKGROUND OF THE INVENTION

Faster exhaustion of conventional fuel resources such as petroleum and crude urges the shifting to electric vehicles in order to nullify the scarcity of conventional fuel resources. Currently, numerous electric vehicles produced by different manufacturers have been launched in the market. That raises an urgent need to develop a charging infra-structure that enables the charging of electric vehicles irrespective of their manufacturers. Implementation of such a versatile infrastructure demands an immense amount of time, labour and expenditure for research and development.

In recent years, on-board chargers cum inverters for electric vehicles are proven to be highly beneficial. The on-board charger cum inverters are capable to charge the battery from the grid in a first mode of operation, and transfers the power from the battery back to drive the traction motor in a second mode of operation. As the same components are used for charging and driving the traction motor in mutually exclusive manner the weight and cost of the production of the power electronics is reduced. This eventually enhances the working of the vehicle. Such kind of on-board charger cum inverters efficiently integrates the function of traction inverter and battery charger, but demands the incorporation of various other components such as input capacitors, rectifiers, bridge converter and transformer into the power electronics of the EV. Incorporation of these components unnecessarily increases weight and production cost of the EV. Additionally, such integrated devices are successful at performing dual mode of operation using any one-kind of power supply. In other words, the prior integrated charger cum traction inverters are configured to perform dual mode of operation with respect to any of single-phase power supply or a three-phase power supply. That means, an vehicle comprising integrated charger cum inverters compatible with a three-phase power supply, cannot be charged when it is provided with a single-phase power supply or vice versa. This hinders the acceptance of EVs by peoples at large, specifically in the least developed or remote areas, where any one kind of power supply is available.

Thus, a flexible integrated charger cum inverter is highly desirable that can perform charging and driving mode of operation using dual phase, i.e., any of the single-phase or three-phase power supply without contributing to additional cost and weight.

OBJECT OF THE INVENTION

To provide a universal single/three-phase power compatible integrated charger cum inverter for an electric vehicle that is configured to function as a charger and inverter using any of single-phase or three-phase power supply.

To provide a universal single/three-phase power compatible integrated charger cum inverter for an electric vehicle that is configured to enable conversion of a single-phase power into a three-phase power or vice versa without requiring incorporation of the diode bridge rectifiers, inductors, filters and/or transformer.

To provide a universal single/three-phase power compatible integrated charger cum inverter for an electric vehicle that has a compact design with a reduced overall footprint, lower component counts, lesser weight and lower cost.

To provide a universal single/three-phase power compatible integrated charger cum inverter for an electric vehicle that accompanied by a higher power density and hence increased mileage or range of the vehicles.

Other objects and advantages of the system of the present disclosure will be more apparent from the following description when read in conjunction with the accompanying figures, which are not intended to limit the scope of the present disclosure.

SUMMARY OF THE INVENTION

In a one embodiment of the present invention, a universal on-board charger cum inverter system is provided. The universal on-board charger cum inverter system comprises a unified charger cum traction inverter (UCCTI) configured to convert multi-phase AC power into DC power and DC power into multi-phase AC power, a rechargeable battery, a traction motor, a first circuit breaker, a second circuit breaker, controller and a voltage sensor to sense voltage and phase of the AC power to the unified charger cum traction inverter (UCCTI). The second circuit breaker disconnected when the first circuit breaker connects the unified charger cum traction inverter (UCCTI) with an external power source in the first and second modes of operation, the first circuit breaker disconnected when the second circuit breaker connects the unified charger cum traction inverter (UCCTI) with the traction motor in the third and fourth modes of operation.

In a preferred embodiment of the invention, the unified charger cum traction inverter (UCCTI) configured to convert three-phase AC power into DC power in first mode of operation wherein the rechargeable battery is charged; convert single-phase AC power into DC power in second mode of operation wherein the rechargeable battery is charged; convert rechargeable battery DC power into three-phase AC power in third mode of operation wherein the three-phase traction motor is powered by the converted three-phase AC power; and convert rechargeable battery DC power into single-phase AC power in fourth mode of operation wherein the single-phase traction motor is powered by the converted single-phase AC power.

Also in one embodiment of the present invention, the controller is configured to operate the unified charger cum traction inverter (UCCTI) in at least one of the first, second, third or fourth modes of operation according to the voltage and phase of external AC power and the traction motor being three-phase or single-phase motor.

In a more preferred embodiment of the present invention, the unified charger cum traction inverter (UCCTI) comprises a plurality of high-frequency switches which are controlled by the controller depending on the mode of operation of the unified charger cum traction inverter (UCCTI).

In a more preferred embodiment of the present invention, the high-frequency switches includes a first group of switches having a set of first and second switches, a second group of switches having a set of third and fourth switches, and a third group of switches having a set of fifth and sixth switches.

In an embodiment of the invention, in the first and the third modes of operation of the unified charger cum traction inverter (UCCTI), the first group, the second group, and the third group of switches are configured to be in ON-state. In the second and fourth modes of operation of the unified charger cum traction inverter (UCCTI), the first group and the second group of switches are configured to be in ON-state, and third group of switches are configured to be in OFF-state.

In a preferred embodiment of the invention, the unified charger cum traction inverter (UCCTI) is configured to receive dual-phase AC power through a transformer or directly from the grid using a power filter.

DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
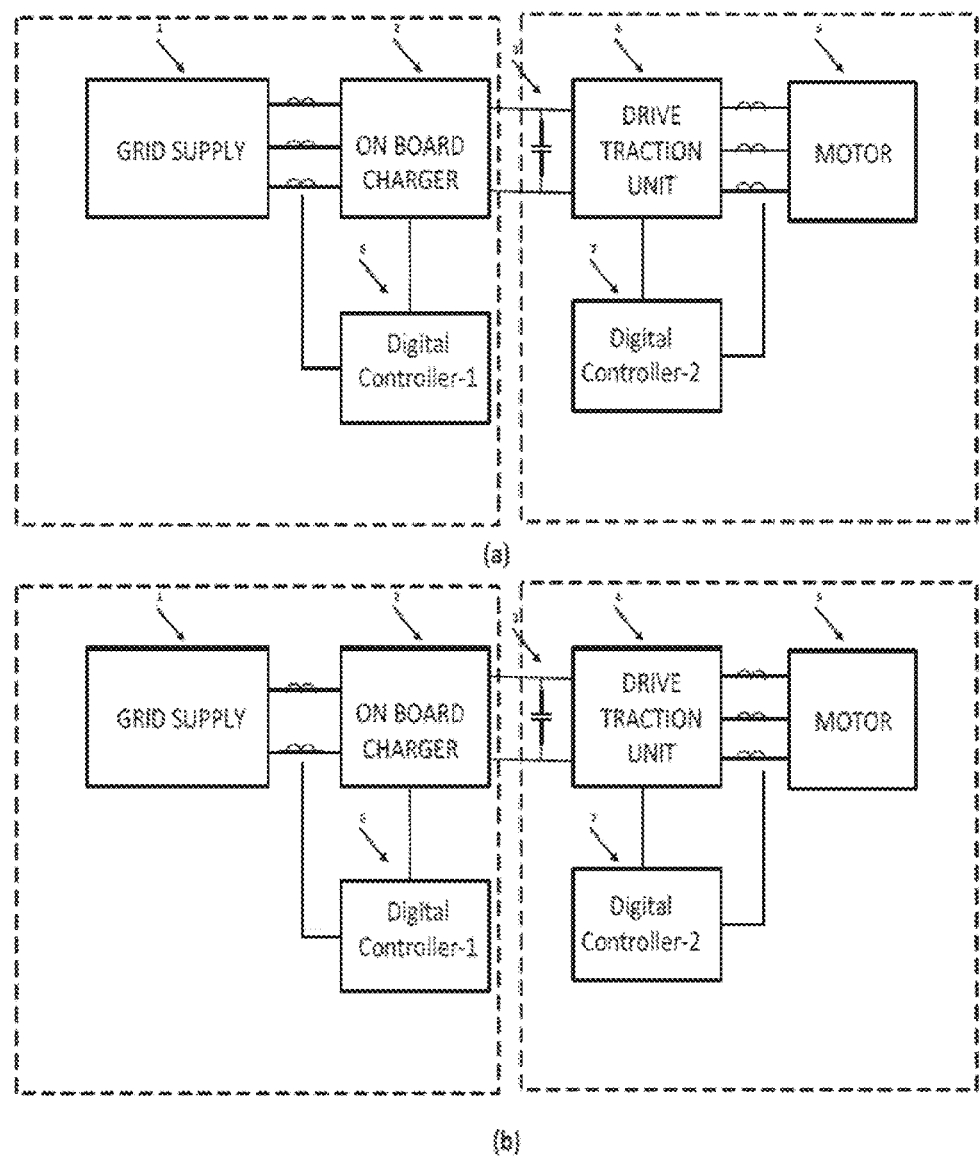
FIG. 1(a) represents a block-diagram of a conventional electrical system having an integrated on-board charger and drive traction inverter unit operating from a three-phase power supply.
FIG. 1(b) represents a block-diagram of a conventional electrical system having an integrated on-board charger and drive traction inverter unit operating from a single-phase power supply respectively.

Referring to FIGS. 1(a) and 1(b), a block diagram of a conventional electrical system (100) having an integrated on-board charger and inverter unit comprises a grid supply 1, an on-board charger (OBC) 2, battery 3, drive traction unit (DTU) 4, traction motor 5, a first controller 6 and a second controller 7.

The on-board charger (OBC) 2 is configured to convert the AC power of a grid supply 1 into a DC supply to charge a battery 3. The process to convert AC into DC supply is called "rectification". The drive traction unit (DTU) is a device that can convert the DC supply from the battery 3 into the variable AC supply to drive the traction motor 5. The process to convert DC into AC supply is called "inversion". The process of rectification to charge the battery 3 is controlled by first controller 6, while the process of inversion to operate the motor 5 is controlled by second controller 7. The three-phase option with the three-phase grid supply is shown in FIG. 1(a) and the single-phase option with the single-phase grid supply is shown in FIG. 1(b) to cover different options of charging as per the availability of the power supply.

Traditionally, separate hardware is used for both DTU and OBC as they perform different functions. The power electronics construction of DTU and OBC are similar in which switches are arranged in the same fashion. The time during which the event of charging and powering the traction motor while riding is performed is also complementary to each other i.e. when the electric vehicle is charged the OBC 2 is active but the DTU 4 is inactive and when the electric vehicle is driven the DTU 4 is active but the OBC 2 is inactive. Hence these two events are mutually exclusive but use a similar construction. In both events, the OBC 2 and DTU 4 are configured to operate from either single-phase power supply or three-phase power supply, not to operate from any of them.

Figure 2:
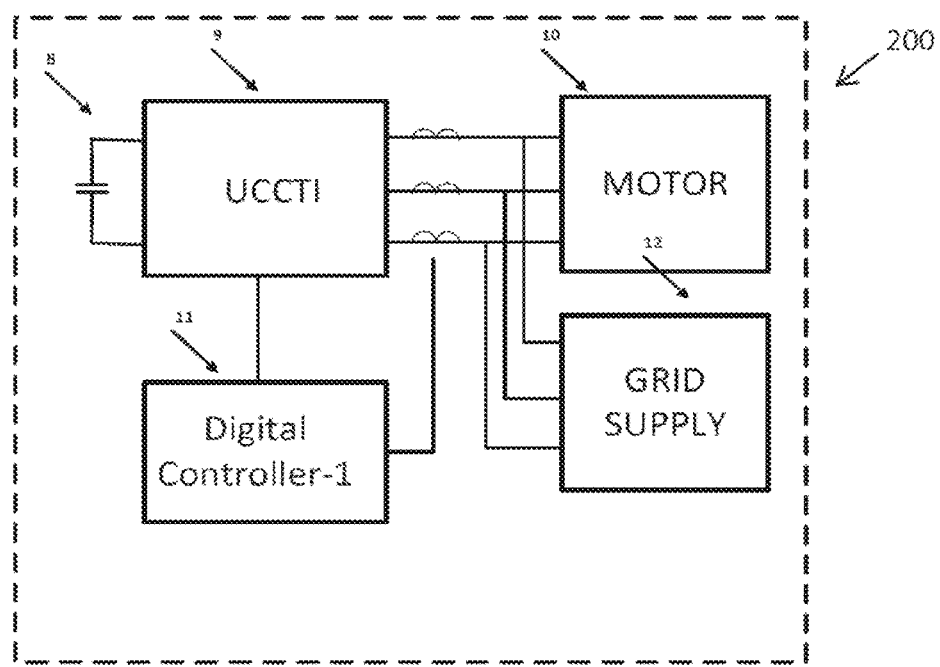
FIG. 2 represents an electrical single line diagram of a universal single/three-phase power compatible integrated charger cum inverter for an electric vehicle according to an embodiment of the present invention.

FIG. 2 represents an electrical single line diagram of a universal single/three-phase power compatible integrated charger cum inverter system 200 according to an embodiment of the present invention. The universal single/three-phase power compatible integrated charger cum inverter system 200 is now referred to as "system 200" from hereinafter for brevity. The system 200 comprises a external power source 12, rechargeable battery 8, a Unified charger cum traction inverter (UCCTI) 9 (will be referred to as UCCTI 9 hereinafter for brevity), a traction motor 10, and a controller 11. Here, although the image has shown an implementation with a three-phase grid supply the same can be understood with respect to implementation with a single-phase grid supply. The system 200 is adapted to be mounted in any of a battery-powered vehicle, a hydrogen-powered vehicle, and a fuel-cell-powered vehicle. In a preferred embodiment of the invention, system 200 is adapted to be mounted in an electric vehicle, EV, more preferably two-wheeler or three-wheeler vehicles.

In an embodiment of the invention, the system 200 further comprises a voltage sensor (not shown) between the UCCTI 9 and the external power source. The voltage sensor is configured to sense voltage and phase of the AC power to the UCCTI 9. In a preferred embodiment of the invention, rechargeable battery 8 (will be referred as battery 8 now onwards for brevity) is selected from a high voltage DC battery or low voltage DC battery. The traction motor 10 is a single-phase motor or three-phase motor. Controller 11 controls the overall operations of the system 200.

The unified charger cum traction inverter (UCCTI) 9 is configured to bi-directionally convert a dual-phase AC power into DC power and DC power into dual-phase AC power. Accordingly, the UCCTI 9 is configured to operate in first, the second, the third and fourth mode of operation. The unified charger cum traction inverter (UCCTI) configured to a) convert three-phase AG power into DC power in first mode of operation wherein the rechargeable battery 8 is charged;

b) convert single-phase AC power into DC power in second mode of operation wherein the rechargeable battery 8 is charged;

c) convert rechargeable battery DC power into three-phase AC power in third mode of operation wherein the three-phase traction motor 10 is powered by the converted three-phase AC power; and, d) convert rechargeable battery DC power into single-phase AC power in fourth mode of operation wherein the single-phase traction motor 10 is powered by the converted single-phase AC power.

Referring to FIG. 2, a battery 8 is operatively connected with UCCTI 9 which is operable either in a charging state or in a driving state. Illustratively, in the first and the second mode of operation, the three-phase/single-phase AC power received from grid supply 12 is converted into a DC power by the UCCTI 9 and stored in battery 8 i.e., the UCCTI 9 is in charging state. In third and fourth modes of operation, the DC power withdrawn from battery 8 via UCCTI 9 to drive the traction motor 10. In a preferred embodiment of the invention, the UCCTI 9 is configured to convert the DC supply from the battery 8 into the variable AC supply to drive the traction motor 10 and vice versa depending upon the traction motor being single-phase or three-phase. That is, the DC power supply from the battery 8 can be converted into three-phase AC power supply (third mode) or single-phase AC power supply (fourth mode). Thus, UCCTI 9 enables the charging of the battery from any of the single-phase or three-phase AC grid supply and similarly, the DC power from the battery can be converted into variable AC input such that the power from battery 8 is used to drive the single-phase or three-phase traction motor 10.

In other words, whenever the UCCTI 9 operates in any of the first mode and the second mode of operation, the vehicle is in a charging state, i.e., charging the battery 8. Similarly, when the UCCTI 9 operates in any of the third mode and the fourth mode of operation, the vehicle is in a driving state, i.e. driving the traction motor 10. As can be seen from FIG. 2, the system 200 use a single battery 8 and single UCCTI 9 to perform charging and driving function without requiring additional components such as a transformer, inductor, rectifier, diodes, or filter resulting in a non-bulky, compact and cost-savvy system that provided improved power density.

In a preferred embodiment of the present invention, whenever the vehicle is in a charging state, the UCCTI 9 is configured to be in the first or second mode of the operation to receive power from the external power source. In a more preferred embodiment of the invention, the external power source can be an external electrical grid. In a still another embodiment of the invention, the electrical grid supplies any of the three-phase or single-phase power. The voltage sensor is configured to sense the voltage and phase of the power received from the external power source. Depending upon the phase of the input power from the external power source, controller 11 operates the UCCTI 9 in any of the first mode or second mode of operation as described above. In any case, the power received from the grid is converted by the UCCTI 9 into DC and is used to recharge the battery 8.

Alternatively, when the vehicle is in a driving state, UCCTI 9 is configured to discharge the battery to drive the traction motor 10. Here, depending upon the traction motor 10 being a single-phase traction motor or a three-phase traction motor, the UCCTI 9 is operated in any of the third mode or the fourth mode of the operation. In simpler words, rechargeable battery DC power is converted into three-phase AC power in third mode of operation wherein the three-phase traction motor is powered by the converted three-phase AC power; and rechargeable battery DC power is converted into single-phase AC power in fourth mode of operation wherein the single-phase traction motor is powered by the converted single-phase AC power.

The system 200 further comprises a first circuit breaker CB1 and a second circuit breaker CB2. The first circuit breaker CB1 is configured to selectively connect the unified charger cum traction inverter (UCCTI) 9 with an external electric source in the first mode of operation and second mode of operation. The second circuit breaker CB2 is configured to selectively connect the UCCTI 9 with the traction motor in the third mode of operation and the fourth mode of operation. In other words, the second circuit breaker is disconnected when the first circuit breaker connects the UCCTI 9 with an external power source in the first and second modes of operation. Similarly, the first circuit breaker is disconnected when the second circuit breaker connects the UCCTI 9 with the traction motor 10 in the third and fourth modes of operation.

Figure 3:
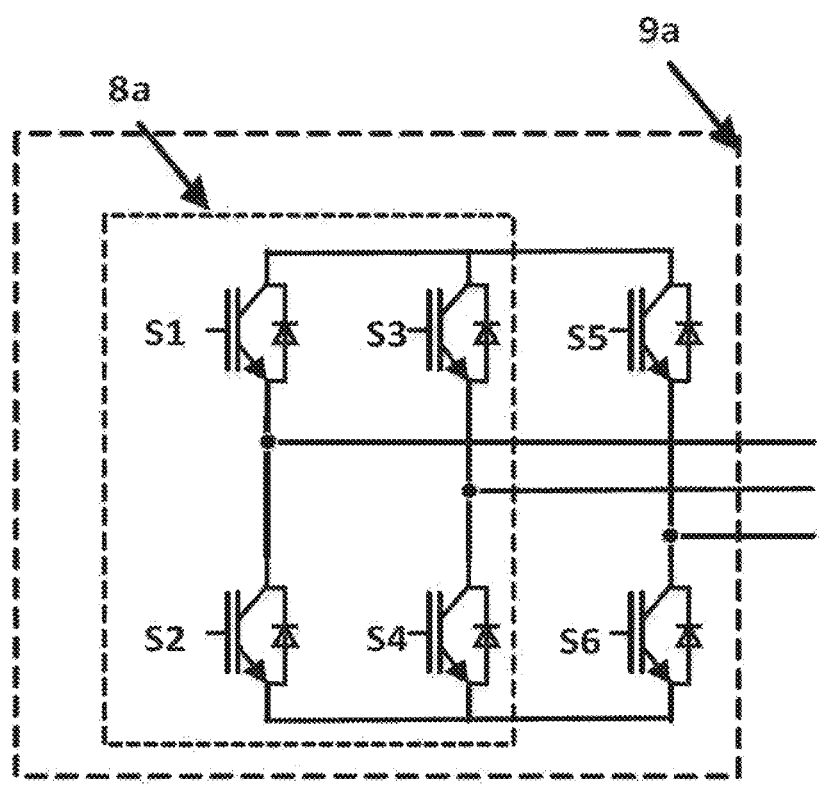
FIG. 3 shows an exemplary configuration of the unified charger cum inverter (UCCTI) operating from single-phase supply and three-phase supply according to an embodiment of the present invention.

In a preferred embodiment of the invention, the UCCTI 9 is configured to perform bidirectional conversion of DC into dual-phase AC output having varying frequency by using a plurality of high-frequency switches which are controlled by the controller depending on the mode of operation of UCCTI 9. FIG. 3 shows an electrical single line diagram of UCCTI 9 of the system 200 operating from three-phase AC power and single-phase AC power according to an embodiment of the present invention. More specifically, the UCCTI 9 comprises a first group of high-frequency switches comprising first and second switches (S1, S2), a second group of high-frequency switches comprising third and fourth switches (S3, S4), and a third group of high-frequency switches comprising fifth and sixth switches (S5, S6).

FIG. 3 shows the first, second, and third groups of high-frequency switches are connected in parallel with each other. Each of the first group (S1-S2), the second group (S3-S4), and the third group (S5-S6) of switches are respectively connected with the first phase, a second phase, and a third phase of the traction motor (see also FIG. 2). The configuration of the high-frequency switches (S1-S6) enables the UCCTI to perform bidirectional conversion of DC input into single-phase/three-phase AC output according to a preferred embodiment of the invention.

The high-frequency switches (S1-S6) are capable of switching from an ON-state to an OFF-state according to the mode of operation of the UCCTI 9. That is, the first group of high-frequency switches (S1, S2), the second group of high-frequency switches (S3, S4) and the third group of high-frequency switches (S5, S6) are configured to be in ON-state in the first and the third mode of operation of UCCTI 9 enabling bidirectional conversion of DC into three-phase AC power or vice versa (see Square 9*a*).

Alternatively, in the second and fourth mode of operation of the UCCTI 9, the first group of high-frequency switches (S1, S2) and the second group of high-frequency switches (S3-S4) are configured to be in ON-state, while the third group of high-frequency switches (S5, S6) are configured to be in OFF-state (see Square 8*a*). In this way, DC power is converted into the single-phase AC power in the second and fourth modes of operation of the UCCTI 9. Thus, the bidirectional conversion of DC into single-phase or three-phase wire has been achieved directly by the simple configuration of a few switches without requiring the use of any rectifier, filter, inductor, transformer etc. the low component count reduces the weight of the system 200 at a greater extent that makes the design compact and cost-savvy with improved power density and range.

Figure 4:
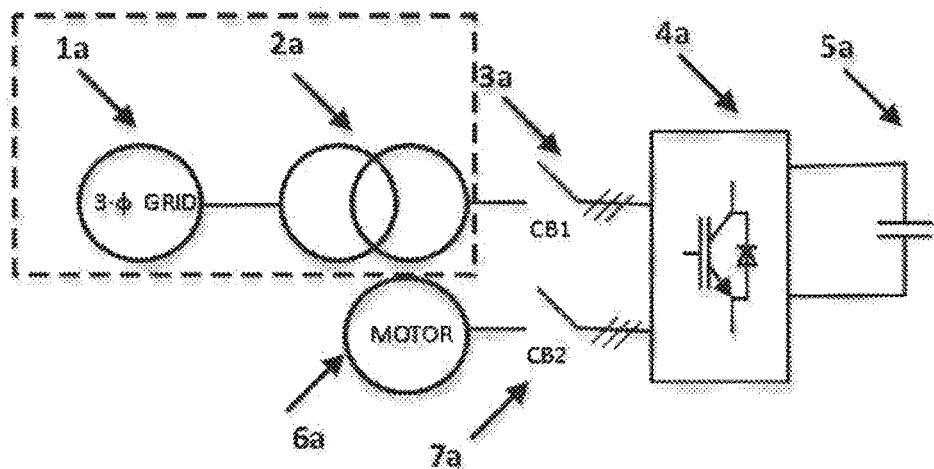
FIG. 4(a) shows of electrical single line diagram of a universal single/three-phase power compatible integrated charger cum inverter operating from three-phase supply according to an embodiment of the present invention.
FIG. 4(b) shows of electrical single line diagram of a universal single/three-phase power compatible integrated charger cum inverter operating from three-phase supply according to an another embodiment of the present invention.
FIG. 4(c) shows of electrical single line diagram of a universal single/three-phase power compatible integrated charger cum inverter operating from single-phase supply according to an embodiment of the present invention.
FIG. 4(d) shows of electrical single line diagram of a universal single/three-phase power compatible integrated charger cum inverter operating from single-phase supply according to an another embodiment of the present invention.
Figure 4:
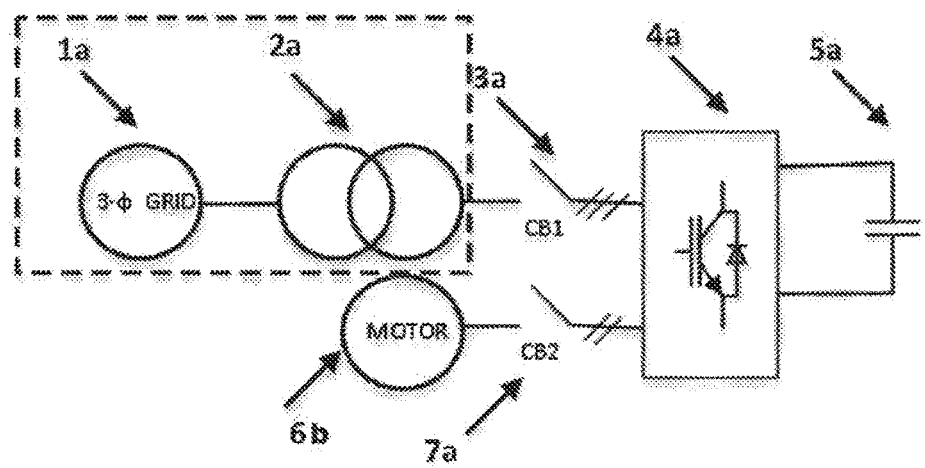
Figure 4:
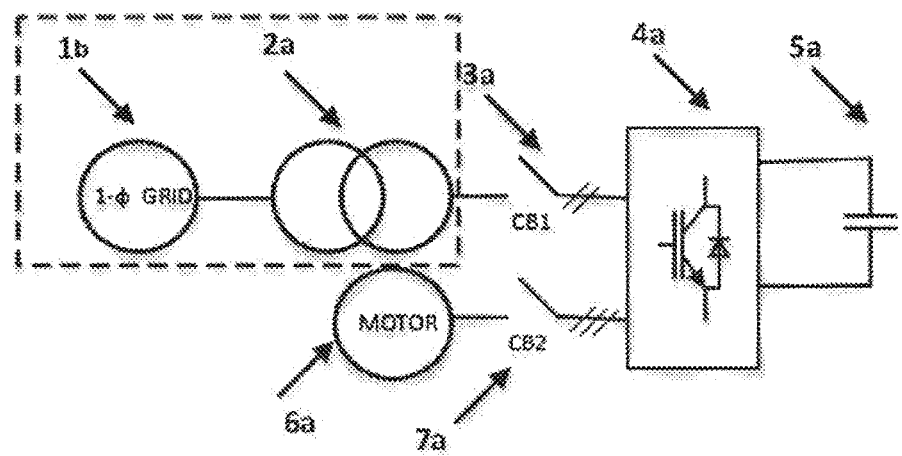
Figure 4:
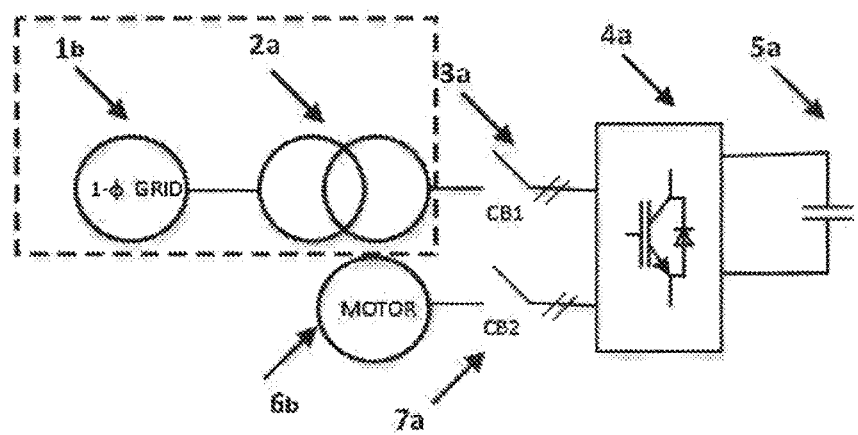

FIG. 4 shows an electrical single line diagram of system 200 showing different operative configurations of UCCTI 9 operating from a three-phase AC power supplying grid 1*a* or a single-phase AC power supplying grid 1*b* with three-phase traction motor 6*a* or single-phase traction motor 6*b*. The features, functions, and configurations of the system 200 in FIG. 4 is same as the system 200 in FIGS. 2 and 3. The different reference numerals denote to the same component in corresponding figure.

FIGS. 4(*a*) and (*b*) shows the configuration of system 200 operating from a three-phase AC power supplying grid 1*a* with single-phase traction motor 6*a* and three-phase traction motor 6*b*, respectively. FIG. 4(*a*) shows the UCCTI 4*a* in the first mode of operation during a charging state, where UCCTI 4*a* converts the three-phase AC power from a 3-phase grid 1*a* into DC power to charge the battery 5*a*. During driving state, to drive a 3-phase traction motor, the UCCTI 4*a* is operated in the third mode of operation to convert the DC power from the battery into the three-phase AC power for driving the traction motor 6*a*. Here also for converting DC power into three-phase AC power all the high-frequency switches (S1 to S6) are operating in ON-State.

Alternatively, referring to FIG. 4(*b*), during the driving state, to drive a single-phase traction motor 6*b*, UCCTI 4*a* is operated in fourth mode of operation, where UCCTI 4*a* converts the DC power from the battery 5*a* into single-phase AC power by operation of the third set of switches (S5, S6) in OFF-state by the controller.

Similarly, FIGS. 4(*c*) and 4(*d*) illustrate the operation of UCCTI 4*a* operating from a single-phase power supplying grid 1*b* with single-phase traction motor 6*a* and three-phase traction motor 6*b*, respectively. Here, UCCTI 4*a* is first operated in the second mode of operation to convert single-phase AC power supply into DC power to charge the battery 5*a* by operating switches S5, S6 in OFF-State. During the driving state, to operate a three-phase motor 6*a*, the UCCTI 4*a* is operated in the third mode of operation to convert the DC power from the battery 5*a* into the three-phase AC power (FIG. 4*c*). In an alternative embodiment of the present invention as shown in FIG. 4*d*, to drive single-phase traction motor 6*b*, UCCTI 4*a* is operated in the fourth mode of operation, where UCCTI 4*a* converts the DC power from the battery 5*a* into single-phase power by configuring the third set of switches (S5, S6) in OFF-state.

The voltage sensor (not shown) is in operative contact with the UCCTI 4*a* to sense the voltage or phase of the power received from the grid supply (1*a*, 1*b*). The controller 11 utilizes the output received from the voltage sensor to operate UCCTI 4*a* in the first mode of operation or second mode of operation during charging state controller 11 determines the phase of the traction motor to determine to operate the UCCTI 4*a* in the third mode of operation or the fourth mode of operation during driving of the EV.

This can be better understood with an exemplary implementation of the system 200 in an electric vehicle having single-phase motor, which needs to be charged from a three-phase grid supply.

Here, the output from the voltage sensor indicates to the controller that the power from the grid supply is three-phase and hence controller operates the UCCTI in first mode of operation. In the first mode of operation, the three-phase AC power is converted into DC power by operating S1-S6 in ON-State. During driving state of EV, controller operates the UCCTI to be operated in the fourth mode of operation as DC power needs to be converted into a single-phase AC output. In the second mode of operation, switches S5-S6 are operated in OFF-State. Thus, the conversion of DC into single-phase and three-phase AC power has been achieved by simple ON/OFF configuration of the two switches (S5-S6). The above system eliminates the need of incorporating the rectifier, bridge, diodes, transformer which makes the prior system bulky and less efficient as the implementation of inductors affects the longevity of the motor.

The system 200 further comprises a first circuit breaker CB1 3*a* and a second circuit breaker CB2 7*a* which enables the isolation of battery 5*a* and the traction motor 6*a*, 6*b* in charging state and driving state, respectively. In a preferred embodiment of the invention the circuit breakers CB1, CB2 (3*a*, 7*a*) are similar to electronic switches known in the art.

In an alternative embodiment, the UCCTI may be operatively connected with an external transformer 2*a* to step up or step down the voltage of the grid to match with that of the battery 5*a*.

In an embodiment, UCCTI 4*a* is configured to receive dual-phase AC power through a transformer 2*a* or directly from the grid using a power filter.

The universal single/three-phase power compatible on-board charger cum inverter system 200 can be implemented in electric vehicle, more preferably electrical vehicle having two or more wheels, more preferably two or three wheels. In an alternative embodiment, system 200 can be implemented within any of battery-powered vehicles, hydrogen-powered vehicles, and fuel-cell-powered vehicles.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An universal on-board charger cum inverter system adapted to be mounted within a vehicle having two or more wheels comprising: a unified charger cum traction inverter (UCCTI) configured to convert multi-phase AC power into DC power and DC power into multi-phase AC power; a rechargeable battery; a traction motor, wherein the traction motor is three-phase motor or single-phase motor; a first circuit breaker and a second circuit breaker; a voltage sensor to sense voltage and phase of the AC power to the unified charger cum traction inverter (UCCTI); the unified charger cum traction inverter (UCCTI) configured to convert three-phase AC power into DC power in first mode of operation wherein the rechargeable battery is charged; convert single-phase AC power into DC power in second mode of operation wherein the rechargeable battery is charged; convert rechargeable battery DC power into three-phase AC power in third mode of operation wherein the three-phase traction motor is powered by the converted three-phase AC power; and convert rechargeable battery DC power into single-phase AC power in fourth mode of operation wherein the single-phase traction motor is powered by the converted single-phase AC power; the second circuit breaker disconnected when the first circuit breaker connects the unified charger cum traction inverter (UCCTI) with an external power source in the first and second modes of operation; the first circuit breaker disconnected when the second circuit breaker connects the unified charger cum traction inverter (UCCTI) with the traction motor in the third and fourth modes of operation; and a controller configured to operate the unified charger cum traction inverter (UCCTI) in at least one of the first, second, third or fourth modes of operation according to the voltage and phase of external AC power and the traction motor being three-phase or single-phase motor.

2. The system as claimed in claim 1, wherein the unified charger cum traction inverter (UCCTI) comprises a plurality of high-frequency switches which are controlled by the controller depending on the mode of operation of the unified charger cum traction inverter (UCCTI).

3. The system as claimed in claim 2, wherein the plurality of high-frequency switches includes a first group of switches having a set of first and second switches, a second group of switches having a set of third and fourth switches, and a third group of switches having a set of fifth and sixth switches.

4. The system as claimed in claim 3, wherein in the first and the third modes of operation of the unified charger cum traction inverter (UCCTI), the first group, the second group, and the third group of switches are configured to be in ON-state.

5. The system as claimed in claim 3, wherein in the second and fourth modes of operation of the unified charger cum traction inverter (UCCTI), the first group and the second group of switches are configured to be in ON-state, and third group of switches are configured to be in OFF-state.

6. The system as claimed in claim 1, wherein the unified charger cum traction inverter (UCCTI) is configured to receive dual-phase AC power through a transformer or directly from the grid using a power filter.

7. The system as claimed in claim 1, wherein the system is adapted to be implemented within a battery-powered vehicle, hydrogen-powered vehicle, and a fuel-cell-powered vehicle.

* * * * *